United States Patent [19]
Lissack

[11] Patent Number: 5,105,139
[45] Date of Patent: Apr. 14, 1992

[54] BRUSHLESS D.C. LIMITED ROTATION ROTARY POSITIONER

[76] Inventor: Selwyn Lissack, 12002 Woodlawn Ave., Santa Ana, Calif. 92705

[21] Appl. No.: 537,631

[22] Filed: Jun. 14, 1990

[51] Int. Cl.⁵ .............................................. G05G 5/00
[52] U.S. Cl. ..................................... 318/626; 318/439; 318/61 S; 310/156; 310/181
[58] Field of Search ................. 310/181, 156, 154; 318/626, 254, 138–139, 438–439, 640, 611, 615

[56] References Cited

U.S. PATENT DOCUMENTS

| | | | |
|---|---|---|---|
| 4,316,648 | 2/1982 | Lissack | 350/6.6 |
| 4,531,079 | 7/1985 | Muller | 318/254 |
| 4,577,139 | 3/1986 | Denhardt et al. | 318/254 |
| 4,656,379 | 4/1987 | McCarty | 310/181 |
| 4,757,224 | 7/1988 | McGee et al. | 310/181 X |
| 4,843,268 | 6/1989 | Hovorka | 310/181 |

Primary Examiner—William M. Shoop, Jr.
Assistant Examiner—David Martin
Attorney, Agent, or Firm—James D. Thackrey

[57] ABSTRACT

A device which rotates an armature through a sequence of angular positions cyclically, using control of the current in a second stator winding while maximum current is applied to a first stator winding. The magnetic poles associated with the two windings are circumferentially offset from each other.

2 Claims, 2 Drawing Sheets

SEC. 3-3

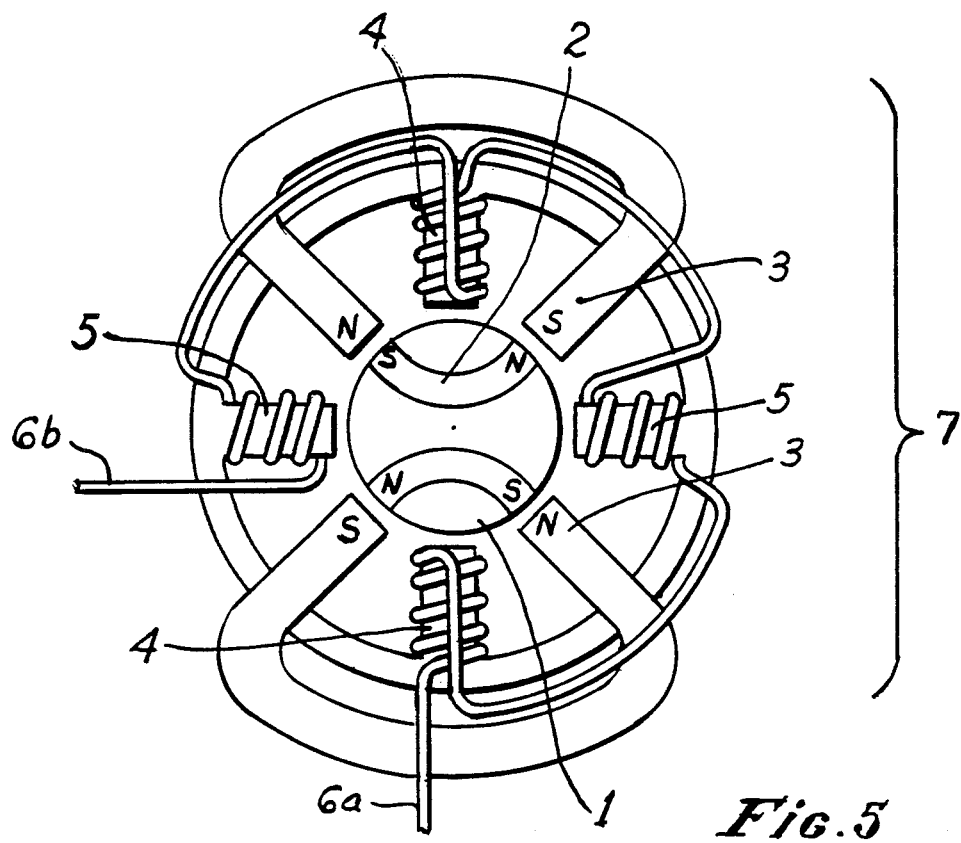
Fig.5
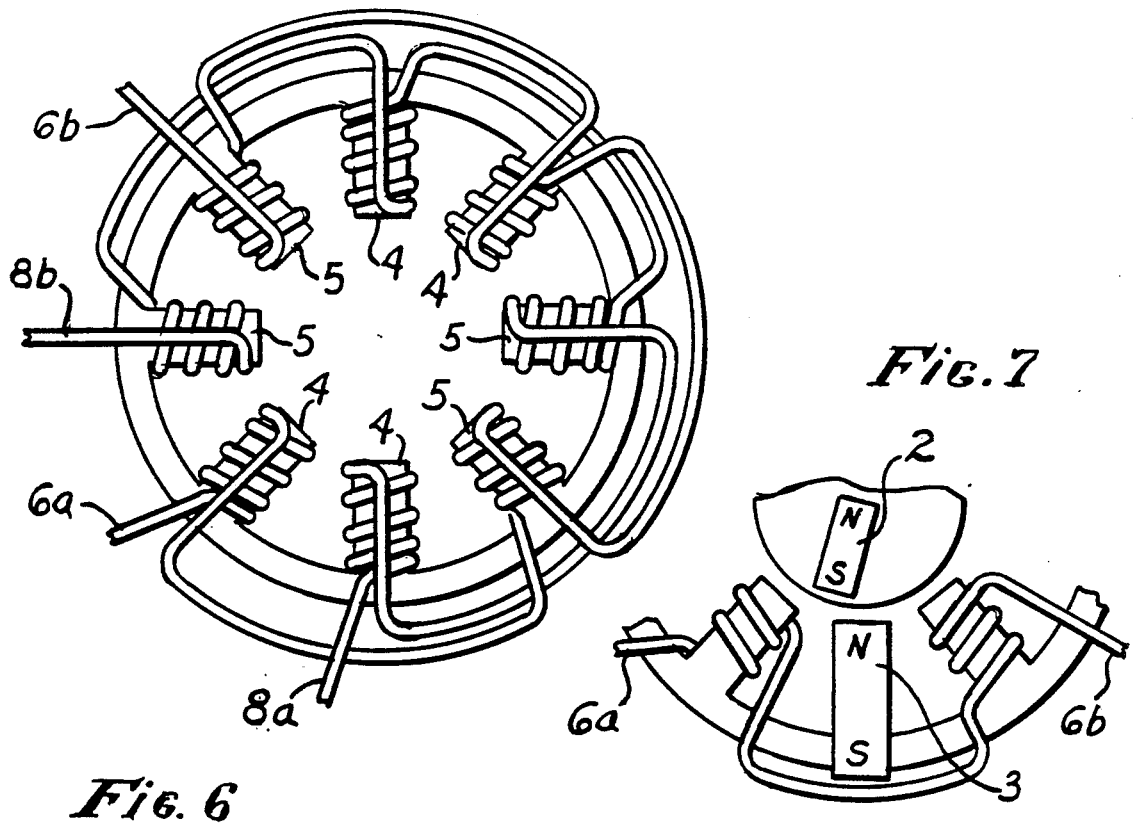
Fig.6
Fig.7

BRUSHLESS D.C. LIMITED ROTATION ROTARY POSITIONER

BACKGROUND OF THE INVENTION

1. Field of the Invention

Positioners may be linear or rotary, depending on whether they push-pull or turn. My invention is the rotary type; a shaft is turned through predetermined angles from a rest position. An example of its use is in the type of optical scanner in which a laser beam is reflected from a mirror attached to the side of the shaft (also called the armature), the location of the reflected spot being determined by the angle of the mirror/shaft assembly. The function of the positioner is to place the spot (the reflected beam), in a cyclical manner at a succession of places on the workpiece. Normally a positioner is not used to perform work, to slide or torque a workpiece—devices intended to do that operation must take account of the forces necessary to move the workpiece and are called actuators.

2. Description of Prior Art

The prior art consists of a magnetic field applied through conventional windings and pole pieces to a rotor, normally suspended on bearings and having a zero-current position dictated by a torsion element coaxial with the rotatable pole elements. The torque applied due to the magnetic field is resisted by the torsion element, usually a tiny shaft which is anchored at the outer end (or ends) and twists through a predictable angle, the angle being proportional to the applied torque due to the magnetic field which in turn is approximately proportional to the current in the windings. Galvanometers may have the windings in the stator or the armature (rotor). Galvanometers are rugged, fairly expensive to construct, and difficult to damp. They tend to oscillate about their final position until friction dissipates the rotary kinetic energy with which torque equilibrium was approached, and mechanical torque damping is difficult to obtain without introducing breakaway static torque which impairs accuracy and sensitivity unduly.

SUMMARY OF THE INVENTION

The invention is described in terms of a first fixed wound pole on the stator, a second fixed wound pole on the stator rotationally displaced from the first, and an armature having a single permanent magnetic pole on its periphery. This visualized set of magnetic poles explains the invention's function adequately. To comply with nature's law which requires pairs of poles in permanent magnets, and to avoid side forces on the armature, the actual invention would hardly be built to the description; a second (or a multiplicity of even numbers) of pole sets would be supplied, symmetrically placed about the armature axis. Each set would simultaneously operate as described below. Also, in this description the word position always refers to the angular orientation of the armature.

When the appropriate polarity of direct current is applied to the first wound pole of the stator, the second wound pole being open circuited, the pole on the armature is attracted and the armature rotates to a rest position. As a steadily increasing current of appropriate polarity is applied to the second wound pole the armature pole is attracted to both stator poles and its position shifts increasingly toward the midpoint between the stator poles, which it reaches when the two currents become equal if the polarity of both stator poles is that which attracts the armature pole. When the current direction in the second stator pole is reversed, its polarity changes to that which repels the armature pole which causes the armature to rotate to a position on the opposite side of the rest position from the second stator pole.

In an actual device, with an even number of sets of poles disposed symmetrically angularly with respect to each other, the current required in the second windings to position the armature at a given angle from rest position clockwise will be the same as is required to reach the same angle counterclockwise. Moreover, the damping of position is automatic and effective since changing positions generates eddy currents in the solid metal armature, quickly dissipating rotary kinetic energy due to the rate of position shift. Eddy current damping is simpler and more reproducible and trouble free than is mechanical damping as required by galvanometers. Further, the basic structure of the preferred embodiment of my invention is that of a motor, giving it a substantial cost saving with respect to a galvanometer.

BRIEF DESCRIPTION OF THE DRAWINGS

FIG. 5 is a view of the working magnetic parts, looking downward upon the simplest version of the invention.

FIG. 6 is a view similar to FIG. 5, showing all active poles of the preferred embodiment.

FIG. 7 is similar to FIG. 6 but shows an alternate embodiment.

DETAILED DESCRIPTION

Figure 1:
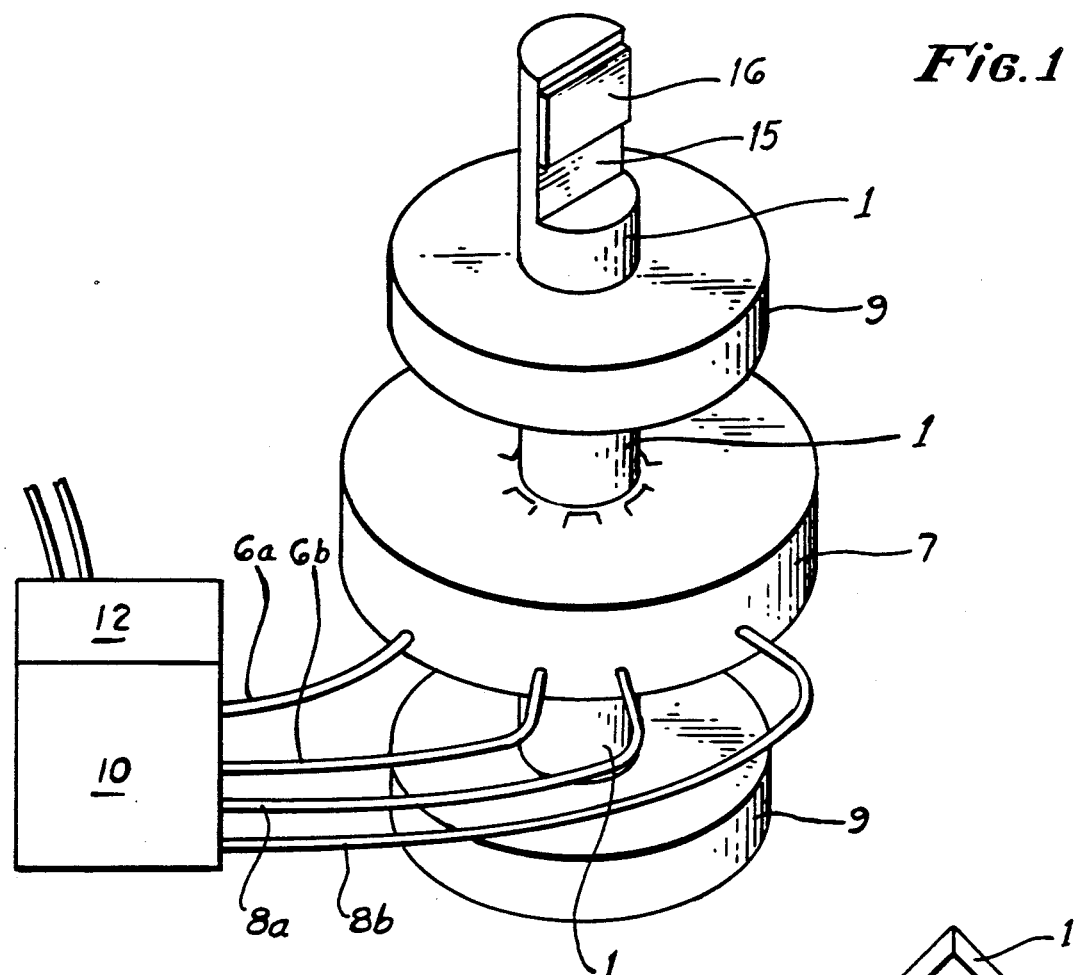
FIG. 1 is a perspective view of the device as a whole, leaving the internal detail to FIGS. 6 and 5.

The overall invention is shown in FIG. 1, which shows the outside view of the entire device in its preferred embodiment as it would be used. Several versions of the primary invention Item 7 may exist (see FIGS. 5, 6 and 7). It can be readily understood that fewer leadwires would be used with some of the alternative versions of Item 7. Moreover, the control elements Items 10 and 12 are so well known to those skilled in the art they are simply shown schematically in FIG. 1. The same applies to Items 17 shown in FIG. 4. Many conventional optoelectronic means would be suitable and could be used without invention by those skilled in the art.

Item 1 is the armature containing implanted magnets as shown in FIGS. 5 or 7, creating a permanent magnet armature. It is supported by bearings Item 9 and passes through Item 7, which may be of several constructions to be discussed later. Leadwires to the wound coils within Item 7 are Items 6a, 6b, 8a, and 8b. Item 10 is a current modulator of conventional components and design. Its function is to apply current to leadwires 6a and 6b, the current and its polarity being preset at a plurality of adjustable settings, each such setting determining one position of mirror Item 16 attached to flat Item 15 on armature Item 1. The sequence and duration of each individual setting is controlled by cycling electronic sequencer-timer Item 12. The ultimate effect of this arrangment is to set mirror 16 at a set of positions determined by the user, with the sequence in which positions are assumed and the duration (or time at each position) controllable by the user, yet repetitive in a cycle as desired. As mentioned above, there exists substantial art for performing these operations (i.e., the functions required of Items 10 and 12) electronically without exercise of the inventive faculty.

Figure 2:
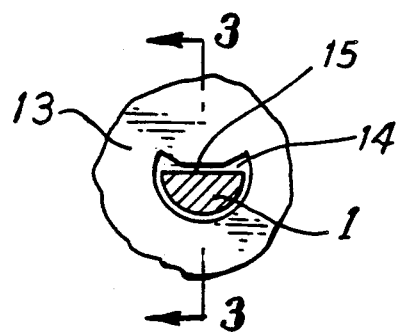
FIG. 2 is a top view of the preferred rotation-limiting stop.
Figure 3:
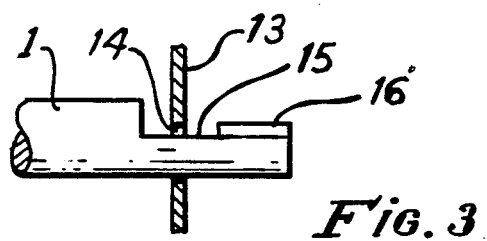
FIG. 3 is a side sectional view of the rotation-limiting stop shown in FIG. 2.

The preferred manner of restricting armature 1 to a single quadrant or less is shown in FIG. 2. For mounting the invention there will always be required a housing or circuit board, Item 13. An aperture 14 in this structure will accept the part of armature 1 which carries flat 15, as shown in FIGS. 2 and 3. The flat-bearing portion of armature 1 passes through aperture 14, but while engaged is prevented from rotating more than 90 degrees or one quadrant. Aperture 14 in conjunction with flat 15 thus comprise rotation-limiting means. Mirror 16 is a flat mirror attached also to flat 15. Its function is to reflect the beam from light source 18, which is fixed in position, to the spot where it is wanted on the workpiece. In the common application Item 18 would be a laser.

Figure 4:
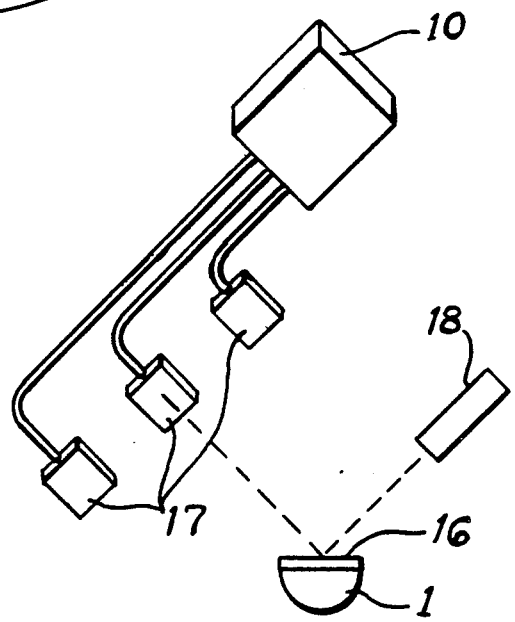
FIG. 4 shows the optomechanical arrangement for position feedback.

FIG. 4 shows the arrangement of components when feedback is used to obtain either speed during the transition from armature position to position or high drift-free accuracy of position. Feedback generators Item 17 are optoelectronic sensors such as photoconductive cells which alter their resistance when illuminated, sending a signal to circuitry in current modulator 10 that the armature position is correct, or needs changed current in the second wound coil to become correct. Again, the art of such feedback is well developed, requiring no invention.

The essence of present invention is a novel application of the tendency of an isolated magnetic pole to seek the region of highest, but opposite, magnetic polarity. FIG. 5 shows armature 1 in the position it would assume with zero current passing from 6a to 6b or vice versa. The poles of permanent armature magnets Item 2 are held centered on the poles of permanent stator magnets Item 3 by magnetic lines of force. Items 4 and 5, stator poles, are of zero strength since there is no current in the second stator winding. When current is applied to 6a–6b stator poles 4 assume opposite polarity to stator poles 5, the region of highest magnetic force shifts rotationally, and armature 1 rotates to bring armature magnets 2 to the required new position.

In FIG. 6 the same thing happens upon application of current to the second stator winding 6a–6b. The first stator winding 8a–8b is at all times held at constant current to keep its poles 4 and 5 generating constant magnetic forces so as to constitute a fixed rotary position reference.

In the embodiment shown in FIG. 7, short bar magnets are used to produce the same effects as do the horseshoe magnets of FIG. 5, both in the armature magnets Item 2 and the stator magnets Item 2.

As noted on FIG. 5, Item 7 is a complete axisymmetric set of poles and coils, which may be individually configured in any of the manners shown. Note also that all the wound poles may be either north or south magnetically and that there is no correspondence between FIG. 5, 6, and 7 as to pole location. The only continuity in the figures is that 6a–6b leadwires always operate the second stator winding at variable-current, whereas 8a–8b leadwires, if they are used, carry the fixed current of the first stator winding.

It happens that the polarity control required for my invention can be attained by a direct current brushless stepper motor of the type having two stator circuits, called in the trade "four phase."

In part, the method used in my invention is an extension and improvement of the use of microstep technique in stepping motors. Normal full steps in two-winding stepping motors involve changing the current direction in one winding at a time, which reverses polarity of the poles associated with that wound stator coil. The armature thus rotates in steps the rotary distance between stator poles. In between steps, partial steps, can be achieved by having a current modulator adjust the two currents to correspond to the sine and cosine of a tilted-current vector, rather than having the vector stay on the $+Y$ or $-Y$ axis as full steps require. Thus both currents are reduced, which means fewer magnetic lines are electromagnetically generated, and consequently the armature position is less positively established than it is in my invention, which leaves one stator winding at full current and hence power at all times.

The invention having been described in its preferred embodiment, it is clear that modifications are within the ability of those skilled in the art without exercise of the inventive faculty. Accordingly, the scope of the invention is defined in the scope of the following claims:

I claim:

1. A rotary positioner actuated by direct current comprising
    a first winding energizing four poles equally spaced around the circumference of a stator, and alternating as to polarity, and
    a second winding energizing four similar poles midway between the poles of said first winding, and
    a permanent magnet armature, and rotation-limiting means mechanically limiting the rotation of said armature to a single quadrant centered about one of the poles energized by said first winding, and
    a constant-current power supply connected to said first winding, and
    a current modulator energizing said second winding and a plurality of feedback generators sensing said permanent magnet armature rotational position and controlling said current modulator's output so as to maintain the rotational position, and
    an electronic cycling sequencer-timer adjustable as to which said feedback means is connected to said current modulator and for how long a period of time during the desired cycle through the desired number of rotary positions each of which has a different feedback generator.

2. A device as described in claim 1 in which said feedback means are optoelectronic sensors.

* * * * *